US 10,235,187 B2

(12) United States Patent
Patil et al.

(10) Patent No.: US 10,235,187 B2
(45) Date of Patent: Mar. 19, 2019

(54) MERGING APPLICATION CONFIGURATIONS TO ENHANCE MULTI-LAYER PERFORMANCE

(71) Applicant: Wyse Technology L.L.C., Santa Clara, CA (US)

(72) Inventors: Rushikesh Patil, Sunnyvale, CA (US); Puneet Kaushik, Fremont, CA (US)

(73) Assignee: Wyse Technology L.L.C., Santa Clara, CA (US)

( * ) Notice: Subject to any disclaimer, the term of this patent is extended or adjusted under 35 U.S.C. 154(b) by 163 days.

(21) Appl. No.: 15/142,049

(22) Filed: Apr. 29, 2016

(65) Prior Publication Data
US 2017/0315827 A1    Nov. 2, 2017

(51) Int. Cl.
*G06F 9/54* (2006.01)
*G06F 9/445* (2018.01)

(52) U.S. Cl.
CPC .......... *G06F 9/44505* (2013.01); *G06F 9/542* (2013.01)

(58) Field of Classification Search
None
See application file for complete search history.

(56) References Cited

U.S. PATENT DOCUMENTS

| | | | |
|---|---|---|---|
| 6,986,039 B1* | 1/2006 | Leah | G06F 21/31 380/274 |
| 8,245,035 B2* | 8/2012 | Khalidi | G06F 9/44505 707/736 |
| 9,330,260 B1* | 5/2016 | Guo | G06F 21/566 |
| 2008/0120439 A1* | 5/2008 | Kwan | G06F 9/44505 710/13 |
| 2009/0182833 A1* | 7/2009 | Balasubramanian | G06Q 10/107 709/208 |
| 2012/0036497 A1* | 2/2012 | Karthik | G06F 8/71 717/122 |
| 2015/0227384 A1* | 8/2015 | Zamir | G06F 8/65 718/1 |

\* cited by examiner

*Primary Examiner* — Tuan C Dao
*Assistant Examiner* — William C Wood
(74) *Attorney, Agent, or Firm* — Kirton McConkie; Brian Tucker

(57) ABSTRACT

Application configurations can be merged to enhance multi-layer performance. When a layering system is employed, a layering registry filter driver can create a merged registry hive that includes the contents of each operating system registry hive as well as the contents of each registry hive of a mounted layer. The merged registry hive will therefore form a single location that the layering registry filter driver can access to complete a registry operation.

20 Claims, 19 Drawing Sheets

900

901
In Response To A First Layer Being Mounted, Create A Merged Registry Hive In A Registry, The Merged Registry Hive Including Contents Of At Least One Operating System Registry Hive And Contents Of A First Registry Hive Stored On The First Layer 902
Receive, At A Registry Filter Driver, A Registry Operation 903
Access The Merged Registry Hive To Complete The Registry Operation

MERGING APPLICATION CONFIGURATIONS TO ENHANCE MULTI-LAYER PERFORMANCE

CROSS-REFERENCE TO RELATED APPLICATIONS

N/A

BACKGROUND

The present invention is generally directed to enhancing the performance of a computing device when multiple layers are mounted to the computing device. A layering system is a tool that enables an operating system, user applications, and user data to be layered on the user's computing device. When using a layering system, layered applications and data are executed natively on the user's computing device without the use of a virtual machine or other sandboxed execution environment. This native execution will therefore cause the layered applications to appear, both to the user and to other applications, as if they were being executed in a "normal" manner. This is in contrast to many types of virtualization techniques such as terminal services and application virtualization where it is typically clear that the applications are executed in a separate environment.

U.S. patent application Ser. Nos. 14/719,248 and 14/719,256 are both directed to a layering system and provide a background for the present invention. The content of these applications is therefore incorporated by reference. It is noted that both of these applications are commonly owned and would not constitute prior art to the present invention. Therefore, this background should not be construed as admitting prior art, but should be construed as describing various features on which the present invention is based and that may even form part of the present invention.

As is described in the '248 and '256 applications, a layer is a collection of data or resources which enables the collection to be isolated or set apart from the data or resources in another layer. To summarize this layering, FIG. 1 provides simplified examples of a user data layer 101 and an application layer 102. It is noted that a layer containing an operating system may also exist. Each layer can be stored in a manner that allows the layer to be separately mounted for access. For example, each layer may comprise a separate partition of a disk (including of a virtual disk), a folder, a network share, etc. The ability to separately mount a layer allows the layering system to selectively provide access to particular layers. It will be assumed that the layering system determines that user data layer 101 and application layer 102 should be mounted in response to the user logging in to a computing device on which the layering system executes or which the layering system otherwise controls.

As shown in FIG. 1 and for simplicity, application layer 102 includes a single application, WINWORD.EXE, which is the executable for Microsoft Word. Word also requires a number of registry settings to execute properly, and therefore, application layer 102 also includes such registry settings. It is noted that these registry settings, which would normally be stored within the registry of the operating system, could be stored within application layer 102 in a registry hive. Of course, a typical installation of Word would require a number of other files and/or settings which are not depicted. Application layer 102 also includes layer metadata which describes the content of application layer 102 (e.g., which describes that the layer includes WINWORD.EXE and whatever structure is used to store the Word registry settings). This layer metadata is critical because it allows the layering system to quickly determine what exists on the layer.

User data layer 101 is structured in a similar way. However, as a user data layer, it stores the user's files which in this case constitute two Word documents: Report.docx and Summary.docx. As with application layer 102, user data layer 101 may also store a number of other files including configuration files that may be particular to this user (e.g., a template file for Word). User data layer 101 also includes layer metadata which defines the content of the layer. Again, this layer metadata is critical because it allows the layering system to quickly determine what exists on the layer.

As mentioned above, a layer can be a separately mountable portion of a storage device (whether physical or virtual) such as a partition, folder, network share, etc. Accordingly, when the user logs on to a computing device, the layering system can mount layers 101 and 102 so that the user will have access to MS Word and his documents which are included in these layers. However, if a different user were to log in to the same computing device, the layering system could instead mount an application layer and user data layer pertaining to the different user so that the different user can only access the applications and user data defined in those layers.

The process by which the user accesses the data and resources included on each layer is provided in the '248 and '256 applications and will not be described in detail in this specification. By way of an overview, the layering system includes a file system filter driver and a registry filter driver which can function to intercept and redirect file system and registry operations as appropriate. In particular, these filters can be registered with the OS so that they will receive all file system and registry operations respectively. If a file system or registry operation pertains to content of a layer rather than to content of the file system or registry directly provided by the OS, the filters can redirect the operation to the corresponding layer. The '248 and '256 applications provide a number of examples of this type of redirection.

The result of this redirection is that, from the user perspective, the files of the layers do not appear to be stored in a different manner than any other file would typically be stored by the OS. For example, if the user data layer 101 were assigned a volume of E:, the layering system could cause the files to appear as if they were stored in the typical C: volume. In other words, the fact that multiple volumes may be loaded is abstracted (and even hidden) from the user perspective. It is again reiterated that the use of layer metadata to define what is stored on each layer allows this process to be carried out efficiently as is described in the '248 and '256 applications.

FIGS. 2A and 2B each illustrate an example of how the layering system can function. Each of these examples involve the layering file system filter driver (or LFFD) 201 and its role in determining whether to redirect a file open request. It is noted that a similar process would be carried out by the layering registry filter driver (or LRFD) if the operation pertained to the registry.

As shown in FIGS. 2A and 2B, it will be assumed that the operating system provides a file system 200 for handling I/O to the various mounted partitions. It will also be assumed that the operating system has mounted a C: volume and that the layering system has mounted an E: volume that corresponds to user data layer 101. In the following description, the E: volume and user data layer 101 (or simply layer) will be used interchangeably. Because of the layering system, even though the E: volume is a separate volume from the C:

volume, the contents of the E: volume will appear as if they were stored on the C: volume. In other words, the layering system can make it appear as if a single volume were mounted.

Accordingly, if the user selects to open the Report.docx file that is stored on the E: volume, a file open request 210 of C:\Docs\Report.docx may be generated. As is described in the '248 and '256 applications, LFFD 201 is registered as a filter driver for file system 200 and therefore will receive the opportunity to evaluate file open request 210. LFFD 201 can evaluate the target of file open request 210 against the layer metadata of the E: volume (and possibly against layer metadata of any other mounted layer) to determine if the request pertains to the layer. In this case, it will be assumed that the layer metadata indicates that the E: volume includes the path \Docs and that the Report.docx file is stored in the path. As a result, LFFD 201 can modify file open request 210 to create modified file open request 210a of E:\Docs\Report.docx. Modified file open request 210a is then passed to file system 200 which will open Report.docx from the appropriate location on the E: volume. LFFD 201 can perform this type of rerouting for any I/O that pertains to content stored on the E: volume. The determination of whether I/O pertains to content on a particular layer is based on the layer metadata for that particular layer.

FIG. 2B illustrates the case where LFFD 201 determines that a file open request 220 does not pertain to a layer (or at least does not pertain to a layer separate from the layer that includes the operating system). In this example, file open request 220 is directed to File.txt which is stored in a Downloads folder that is assumed to exist on the C: volume. Upon receiving file open request 220, LFFD 201 will evaluate the request against the layer metadata for the E: volume and determine that the E: volume does not include a path of \Downloads. Accordingly, LFFD 201 can allow file open request 220 to pass to file system 200 without modification since the request already includes the correct path to File.txt.

To summarize, LFFD 201 selectively modifies I/O requests so that they are directed to the appropriate layer. In the case of registry access, the LRFD would perform similar functionality to ensure that the registry access is directed to the appropriate layer. It is again reiterated that this rerouting is necessary because the layering system causes the layers to be hidden from the user's perspective while still being visible to the underlying file system.

In typical systems that implement this type of layering, there may be multiple layers mounted that each provide applications to the user. FIG. 3 illustrates an example of this. As shown, a system may include an operating system partition 301 (which may or may not be a layer) on which the operating system 302 and registry hive 303 are stored. Registry hive 303 can include configuration settings of operating system 302 and possibly of any application on operating system partition 301 or any application that may be executed on the system. As an example, operating system partition 301 can represent a typical partition of a system's hard drive or may represent a vdisk. When operating system 302 executes, it will load registry hive 303 into the registry where the configuration settings can be accessed (e.g., via the configuration manager) by the operating system and other processes/threads.

FIG. 3 also illustrates two application layers 311, 321 that are assumed to have been mounted by layering file system filter driver (LFFD) 330 on the system. As an example, each of application layers 311, 321 could be a separate drive, a separate partition of a drive, a VHD, a network share, a mounted folder, etc. Application layer 311 includes applications 312a and 312b while application layer 321 includes applications 322a and 322b. Application layers 311 and 321 also include registry hives 313 and 323 respectively which store the configuration settings for the applications on the respective application layer. For example, registry hive 313 can store any registry keys and corresponding values employed by application 312a or application 312b while registry hive 323 can store any registry keys and corresponding values employed by application 322a or application 322b. Although not shown, each application layer 311, 321 can include layer metadata (of which registry hives 313, 323 form a part).

As described in the '248 and the '256 applications, when a layer is mounted, LFFD 330 can load the layer's registry hive into the registry where it can be accessed using typical registry operations. Layering registry filter driver (LRFD) 340 can be registered with the configuration manager of operating system 302 to receive any calls to access the registry. When LRFD 340 receives a registry operation it can access the layer metadata of each layer to determine to which registry hive the registry operation should be directed. LRFD 340 can then modify the registry operation so that it includes the correct path.

FIGS. 3A-3C illustrate an example of how each of registry hives 303, 313, and 323 can be loaded into the registry. In FIG. 3A, the operating system's registry hive 303 is shown as being loaded. For simplicity, registry hive 303 is shown as including a subkey (\SOFTWARE\Microsoft\Windows\CurrentVersion) that has a single value (CommonFilesDir) with data of C:\Program Files\Common Files. When this subkey is loaded into registry 450, it will be positioned under the HKLM key as shown. Therefore, any request to access the CommonFilesDir value will specify a path of (or more particularly, will provide a handle to) HKLM\SOFTWARE\Microsoft\Windows\CurrentVersion.

FIG. 3B illustrates how registry hive 313 can be loaded into registry 450 when application layer 311 is mounted. Registry hive 313 is shown as including a subkey (\SOFTWARE\Vendor1\Key1) that has a single value (InstallDirectory) with data of C:\Program Files\Vendor1\Dir1. Although this subkey may have a similar path as the CommonFilesDir subkey (i.e., although this subkey falls under the SOFTWARE subkey), because it is part of a different registry hive, it will be loaded in a unique location. As shown, rather than storing the \SOFTWARE\Vendor1\Key1 subkey under the existing SOFTWARE subkey (which would typically be the case if the corresponding application had been installed on operating system partition 301), the subkey is stored under the subkey AppLayer311. Accordingly, but for LRFD 340, any request to access the InstallDirectory value would need to specify a path of HKLM\AppLayer311\SOFTWARE\Vendor1\Key1. However, as described in the '248 and the '256 applications, LRFD 340 can cause the contents of registry hive 313 to appear as if it were not separate from registry hive 303. In other words, LRFD 340 can cause the value to appear as if it is located at HKLM\SOFTWARE\Vendor1\Key1.

FIG. 3C illustrates how registry hive 323 can be loaded into registry 450 when application layer 321 is mounted. The same process can be performed as described above so that subkey \SOFTWARE\Vendor2\Key1 is stored under the AppLayer321 subkey. Therefore, the EnableUsageStats value can be accessed at the path HKLM\AppLayer321\SOFTWARE\Vendor2\Key1. However, due to the role of LRFD 340, this subkey will appear to applications and the operating system as if it was stored at HKLM\SOFTWARE\Vendor2\Key1.

To implement this abstraction, LRFD 340 intercepts any registry operation to determine whether the operation is directed to a registry hive of one of the mounted layers rather than to the operating system's registry hive. For example, in response to receiving a request to obtain a value of a particular registry subkey, LRFD 340 may be configured to first access registry hive 313 to determine if it includes the key (e.g., by determining whether the subkey is stored under the AppLayer311 subkey). If the subkey is found in registry hive 313, LRFD 340 may respond with its value. However, if the subkey is not found in registry hive 313, LRFD 340 may then access registry hive 323 to perform the same process. If LRFD 340 does not find the subkey in registry hive 323, it would then allow the operating system to fulfill the request in a normal fashion.

Accordingly, LRFD 340 is configured to iteratively access the application layer registry hives when handling a registry operation. If none of the application layer registry hives have the subkey that is the target of the registry operation, LRFD 340 will pass the registry operation on to operating system 302 for normal processing.

This iterative process can degrade the performance of a layering system. For example, in practice, most registry operations will be directed to operating system registry hive 303. In such cases, LRFD 340 will still access the registry hive of each application layer prior to passing the registry operation on to the operating system. These unnecessary accesses to the application layer registry hives can significantly increase the amount of processing performed by the layering system. For example, if ten layers are mounted and a request to read a value in registry hive 303 is received, LRFD 340 may perform at least ten unnecessary mappings/reads of the registry (at least one for each application layer registry hive loaded in the registry) prior to passing the request on to the operating system.

BRIEF SUMMARY

The present invention extends to methods, systems, and computer program products for merging application configurations to enhance multi-layer performance. When a layering system is employed, a layering registry filter driver can create a merged registry hive that includes the contents of each operating system registry hive as well as the contents of each registry hive of a mounted layer. The merged registry hive will therefore form a single location that the layering registry filter driver can access to complete a registry operation as opposed to being required to iterate through each layer's registry hive.

In one embodiment, the present invention is implemented as a method for enhancing multi-layer performance by merging application configurations. In response to a first layer being mounted, a merged registry hive can be created in a registry. The merged registry hive can include contents of at least one operating system registry hive and contents of a first registry hive stored on the first layer. A registry filter driver can receive a registry operation and then access the merged registry hive to complete the registry operation.

In another embodiment, the present invention is implemented as computer storage media storing computer executable instructions which when executed implement a method for enhancing multi-layer performance by merging application configurations. A first layer can be mounted on a computing system. The first layer includes a first registry hive. As part of mounting the first layer, the first registry hive can be loaded into a registry of an operating system executing on the computing system. The registry can include one or more operating system registry hives. Also, as part of mounting the first layer, a merged registry hive can be created in the registry. The merged registry hive can include the first registry hive and the one or more operating system registry hives. One or more additional layers can then be mounted to the computing system. At least one of the one or more additional layers includes a registry hive. For each of the at least one of the one or more additional layers, the registry hive of the additional layer can be loaded into the registry, and the merged registry hive can be updated to include the registry hive of the additional layer.

In another embodiment, the present invention is implemented as a layering system comprising: one or more processors; and memory storing computer executable instructions which when executed implement a registry filter driver that is configured to create or update a merged registry hive when a layer is mounted to the layering system. The merged registry hive includes contents of one or more operating system registry hives and contents of a registry hive stored on any layer that is mounted.

This summary is provided to introduce a selection of concepts in a simplified form that are further described below in the Detailed Description. This Summary is not intended to identify key features or essential features of the claimed subject matter.

BRIEF DESCRIPTION OF THE DRAWINGS

Understanding that these drawings depict only typical embodiments of the invention and are not therefore to be considered limiting of its scope, the invention will be described and explained with additional specificity and detail through the use of the accompanying drawings in which.

DETAILED DESCRIPTION

In this specification and the claims, a non-modifying registry operation should be construed as any registry operation that does not result in a registry key, value, or other structure being modified. For example, a read operation (e.g., RegGetValue or RegQueryValue) or an enumerate operation (e.g., RegEnumKey or RegEnumValue) would be a non-modifying registry operation. On the other hand, a modifying registry operation should be construed as any registry operation that results in a registry key, value, or other structure being modified. For example, a create operation (e.g., RegCreateKey), a write operation (e.g., RegSetKeyValue), or a delete operation (e.g., RegDeleteKey) would be a modifying registry operation.

The present invention is generally directed to enhancing the performance of a layering system by employing a merged registry hive. By creating a merged registry hive, a layering registry filter driver can access the merged registry hive to complete non-modifying registry operations. In contrast, the layering registry filter driver can complete modifying registry operations by updating the merged registry hive as well as the registry hive that is the source of the content to be updated. Given that the vast majority of registry operations in a typical system are non-modifying registry operations, the use of the merged registry hive can greatly increase the performance of a layering system.

Figure 1:
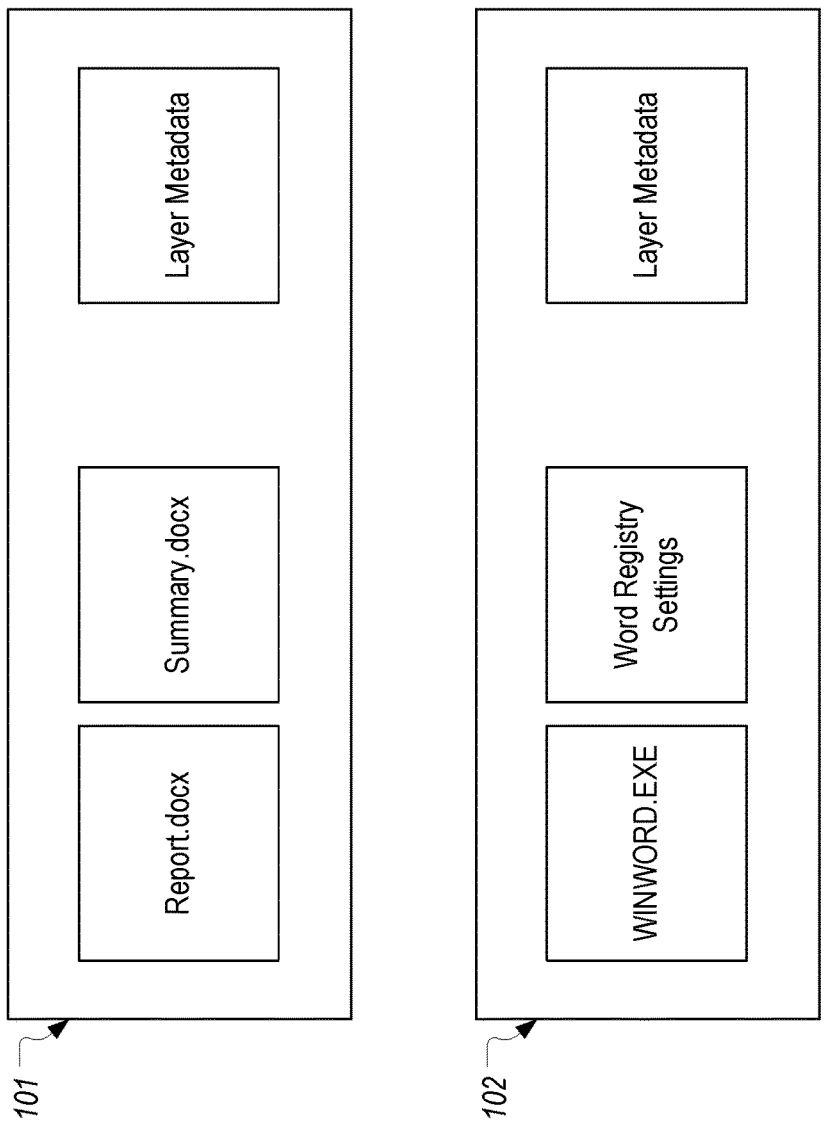
FIG. 1 illustrates simplified examples of layers of a layering system.
Figure 2A:
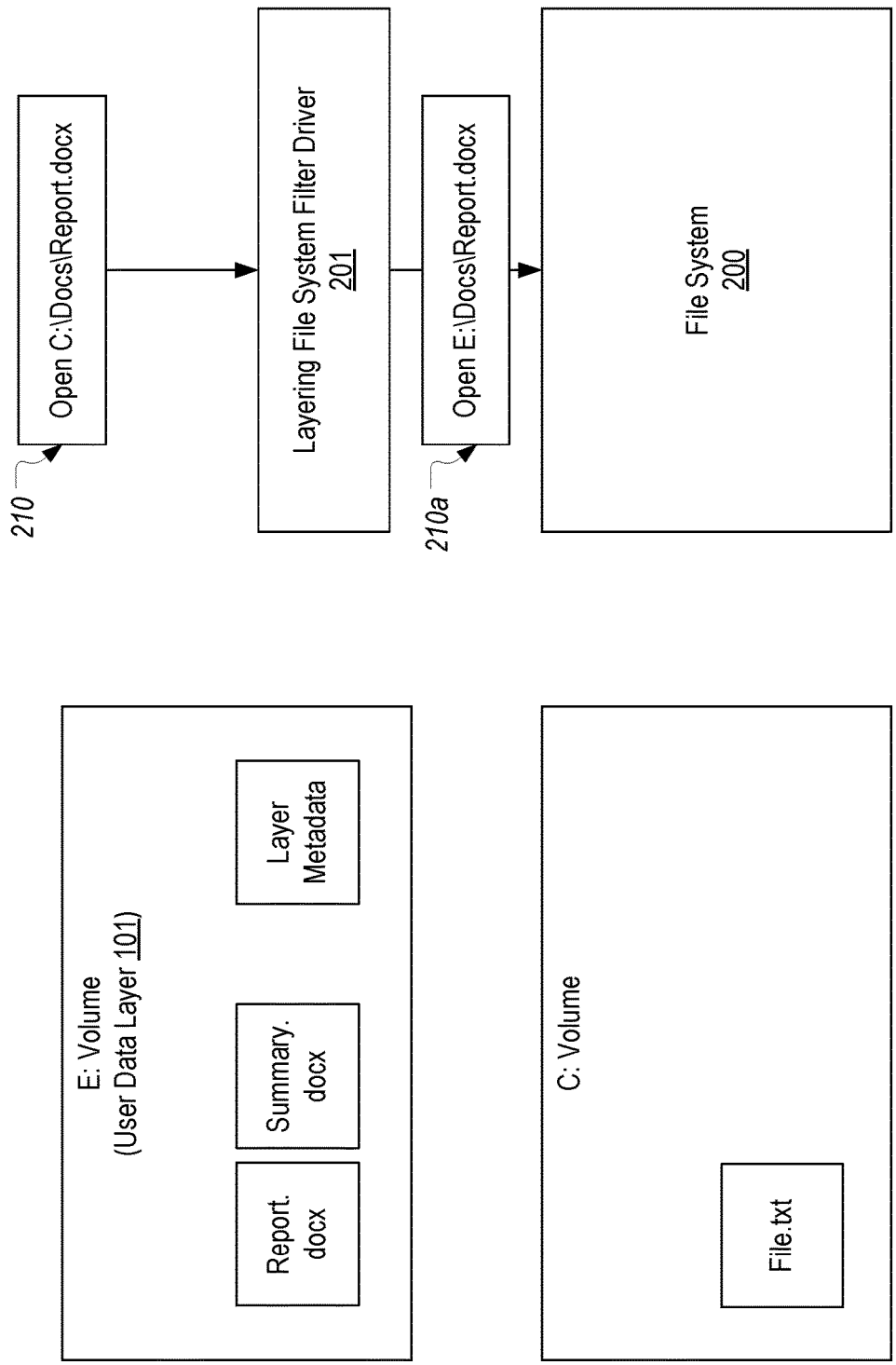
FIGS. 2A and 2B generally illustrate how a layering system can reroute file system or registry operations based on layer metadata of a mounted layer.
Figure 2B:
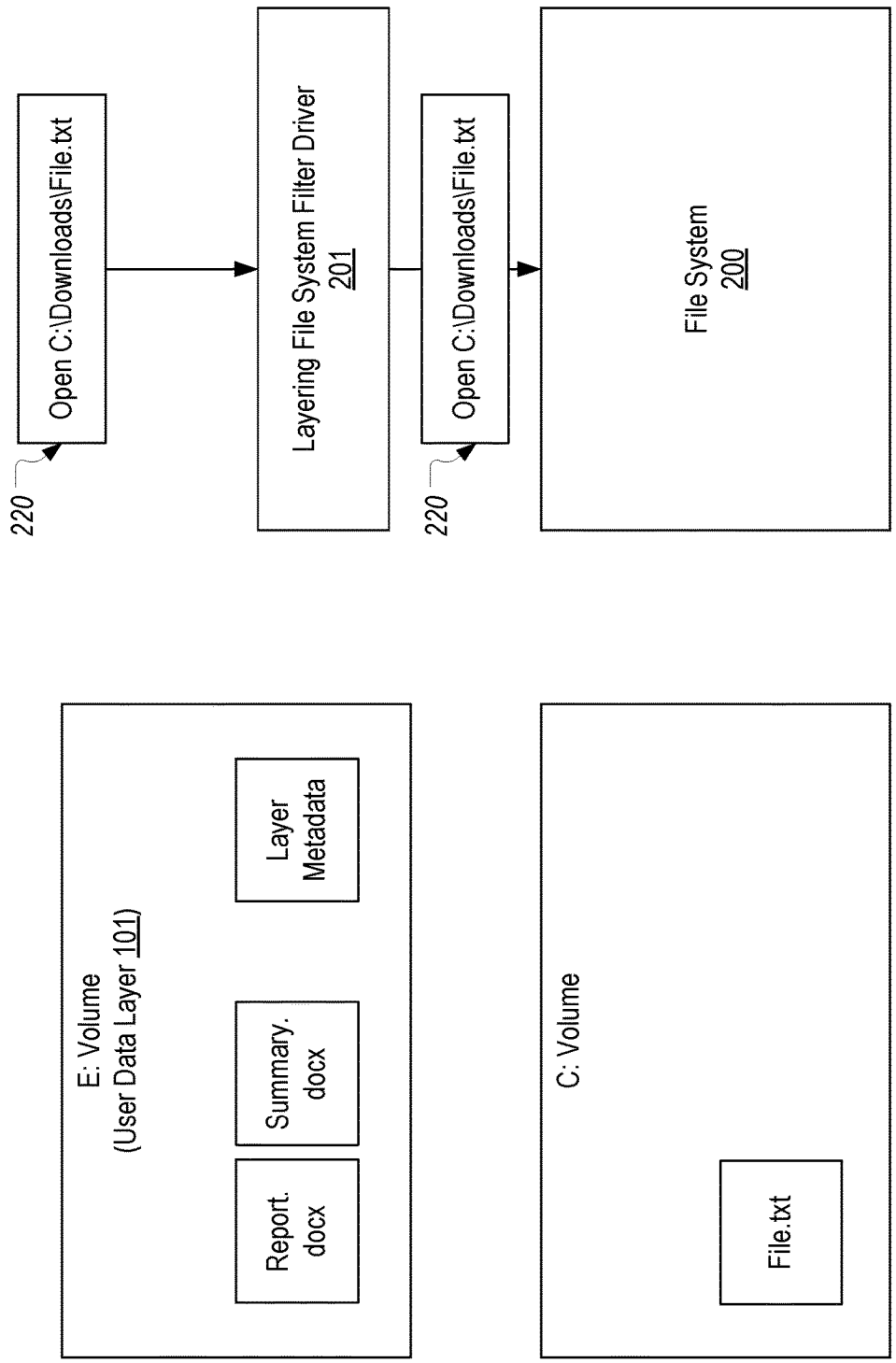
Figure 3:
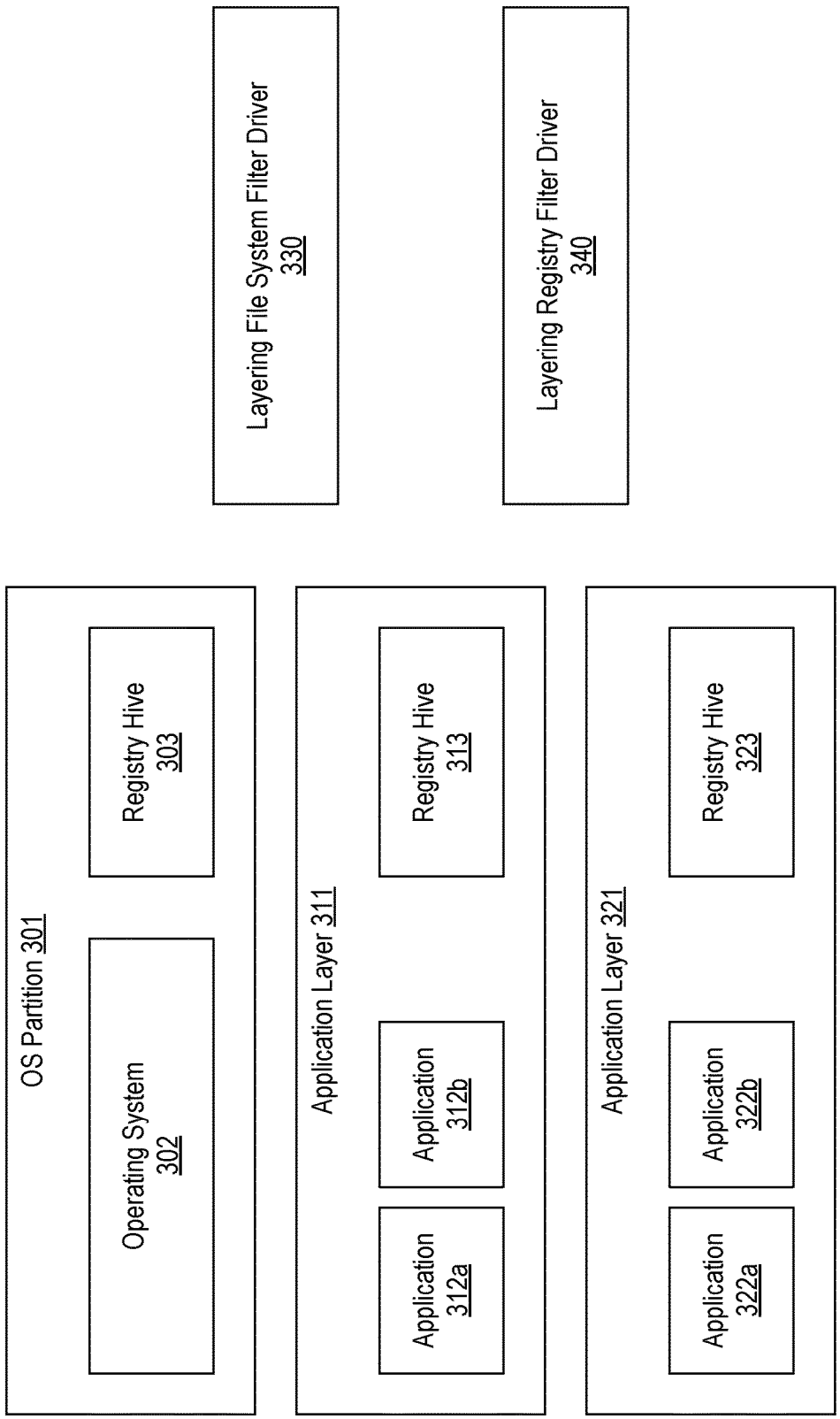
FIG. 3 illustrates how an operating system and each layer can include at least one registry hive storing configuration settings.
Figure 3A:
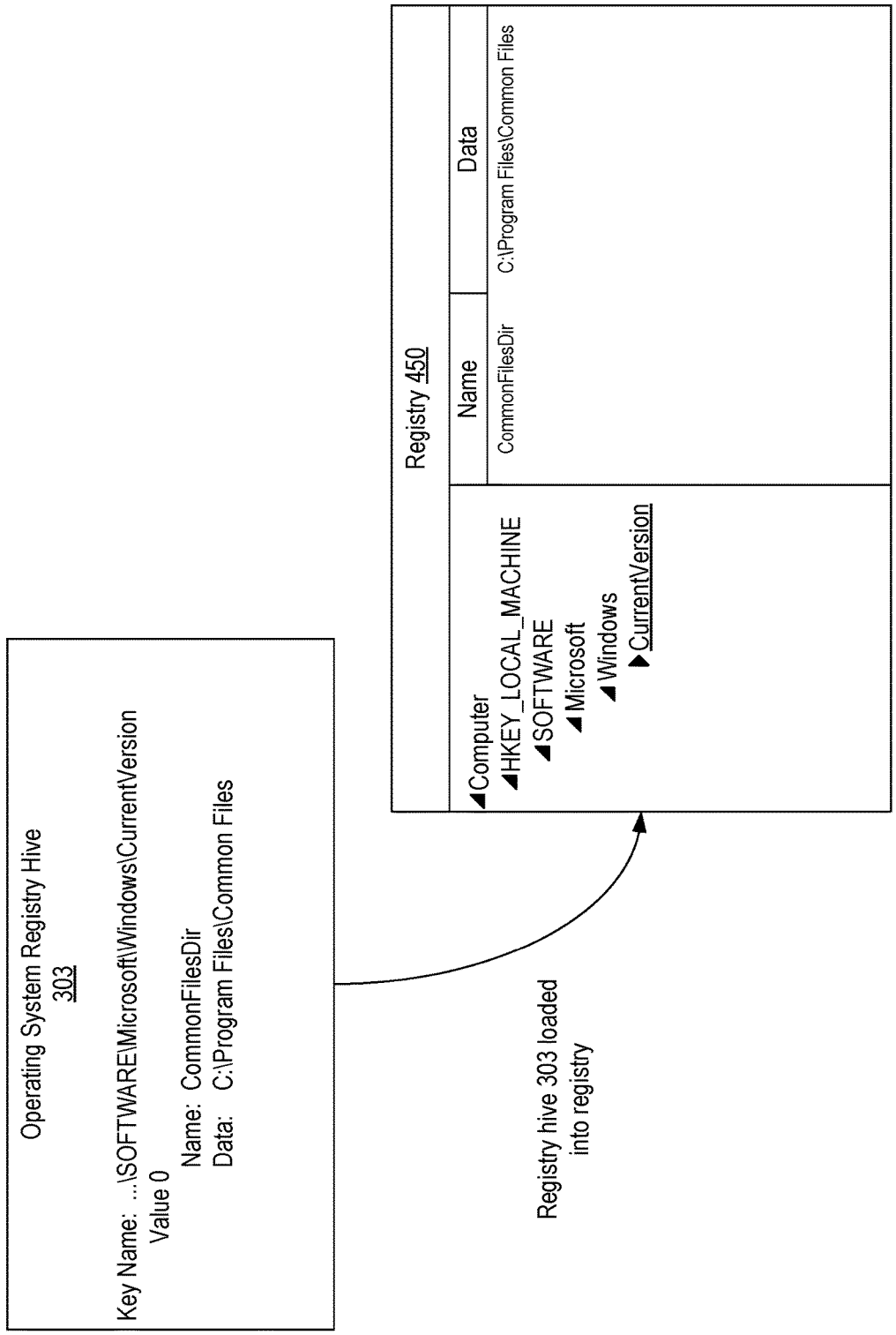
FIGS. 3A-3C illustrates how the layer registry hives can each be loaded into the registry.
Figure 3B:
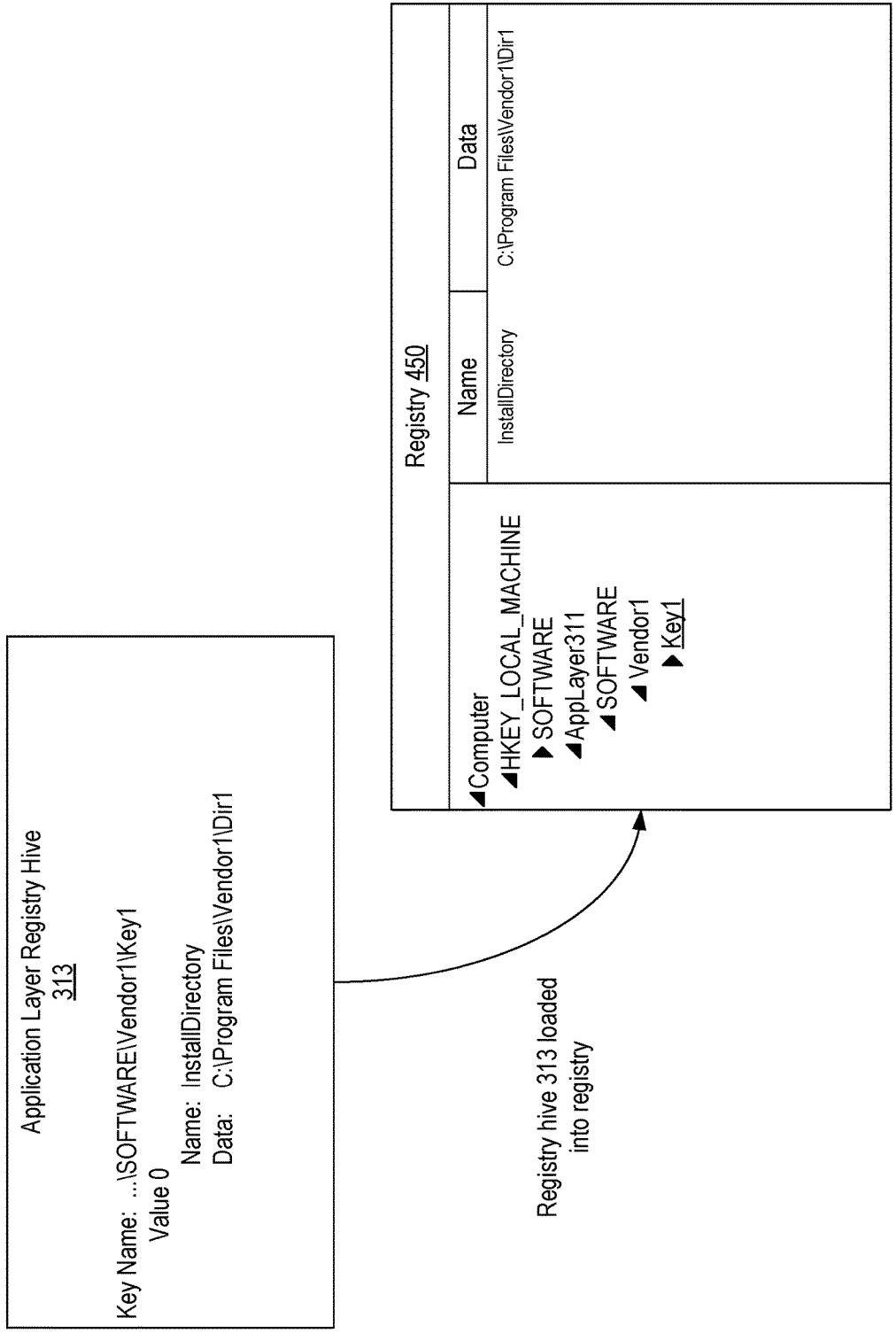
Figure 3C:
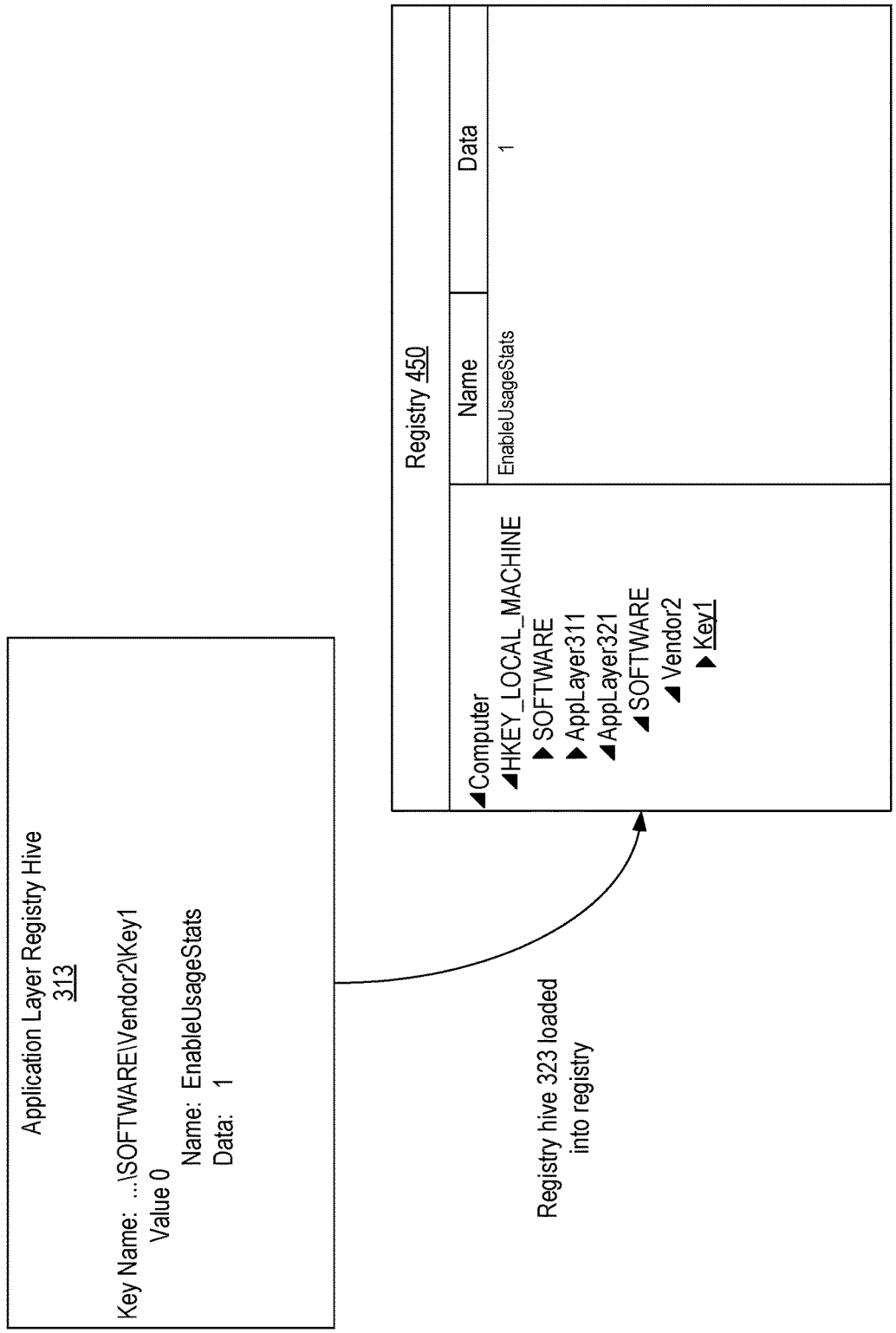
Figure 4A:
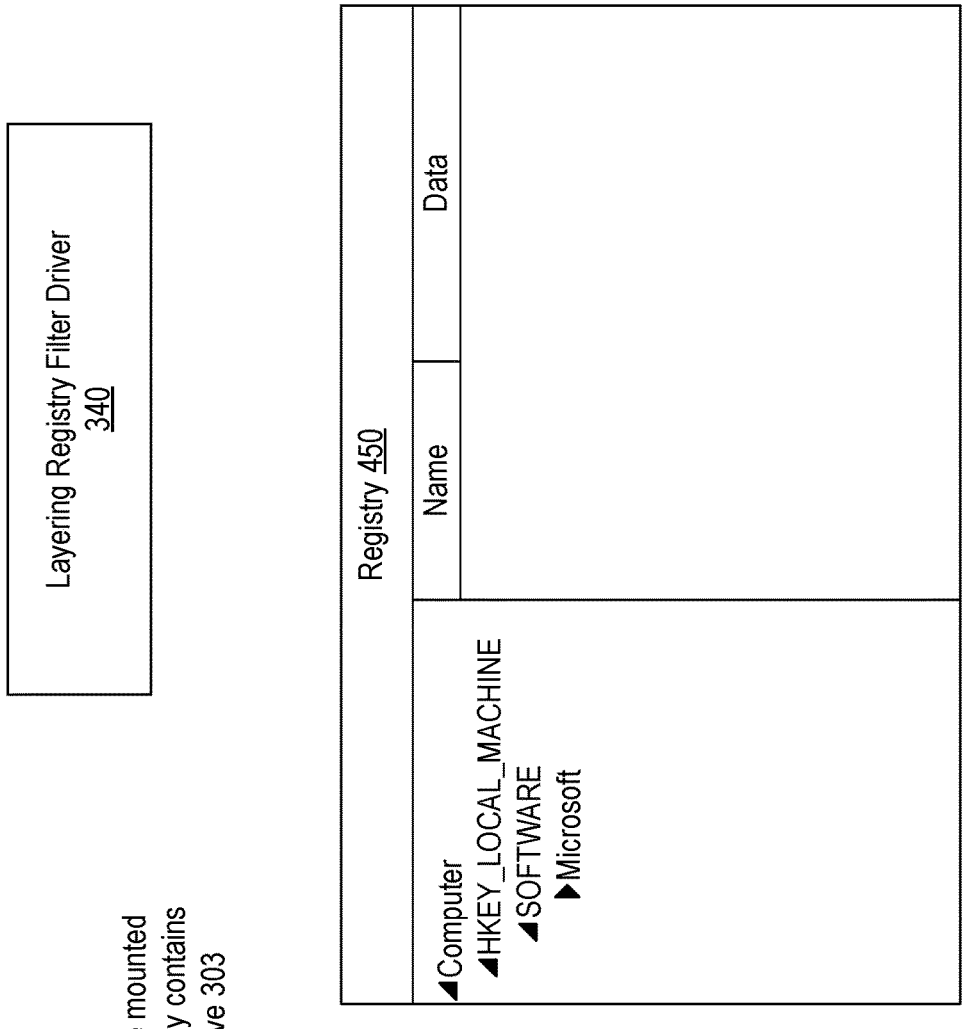
FIGS. 4A-4E illustrate a simplified example of how a merged registry hive can be created and updated when layers are mounted.

FIGS. 4A-4E illustrate how a merged registry hive can be created. FIG. 4A can represent the state of a layering system (i.e., a computing system that is configured to implement layering) before any layers have been mounted as indicated in step 1. In this state, operating system 302 (which may be provided on an operating system layer (e.g., in the form of a vdisk) or may be provided in a standard manner (e.g., on a partition of a physical hard drive)) has been loaded. As described above, operating system 302 will maintain a registry hive (or hives) 303 that stores configuration settings for the operating system and possibly any applications that are stored on operating system partition 301. As part of loading operating system 302, registry hive 303 will also be loaded into the registry 450. Also, in this state, it is assumed that layering registry filter driver (LRFD) 340 will have registered with operating system 302 to receive function calls to access the registry. Because no layers (other than possibly operating system partition 301) have been mounted, LRFD 340 can simply pass any registry operation on to operating system 302 for normal handling.

Figure 4B:
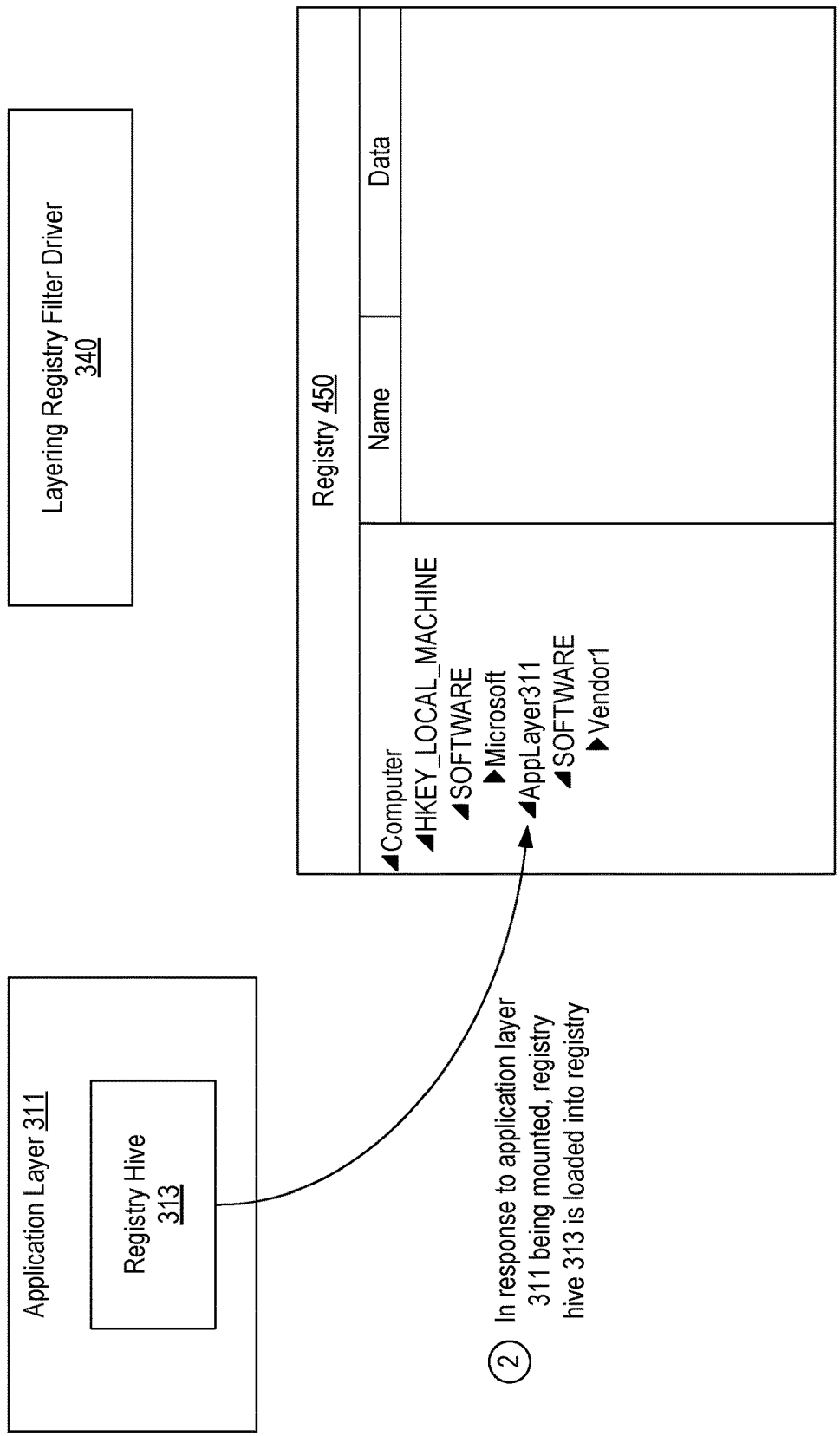
Figure 4C:
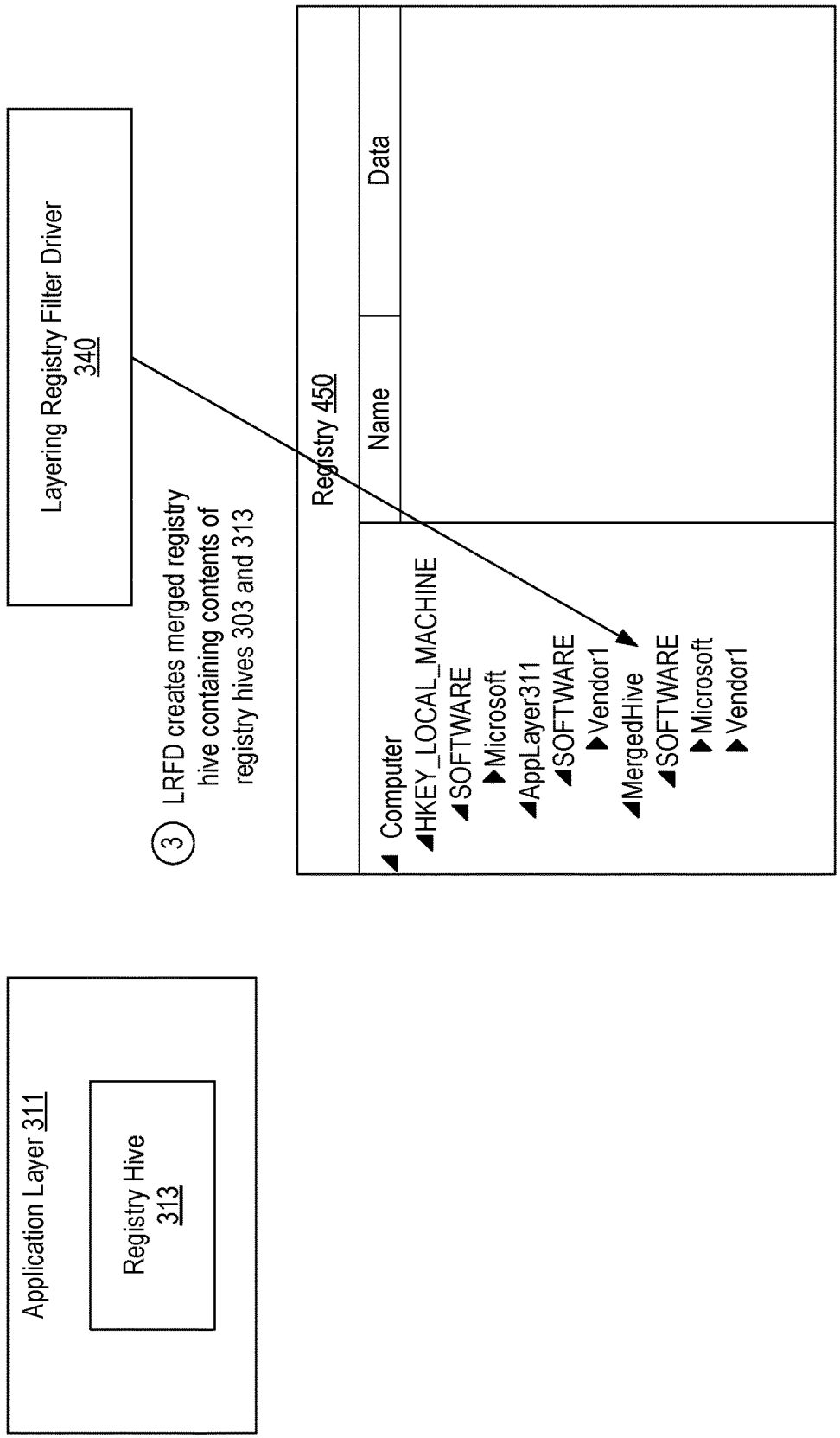

At some later time, it is assumed that application layer 311 is mounted as is represented in step 2 of FIG. 4B. As part of this mounting, registry hive 313 can be loaded into registry 450 as described above. Additionally, LRFD 340 can determine that this is the first layer that has been mounted and can therefore create a merged registry hive which contains the contents of operating system registry hive 303 as well as the contents of registry hive 313 on application layer 311 as indicated in step 3 of FIG. 4C.

Figure 4D:
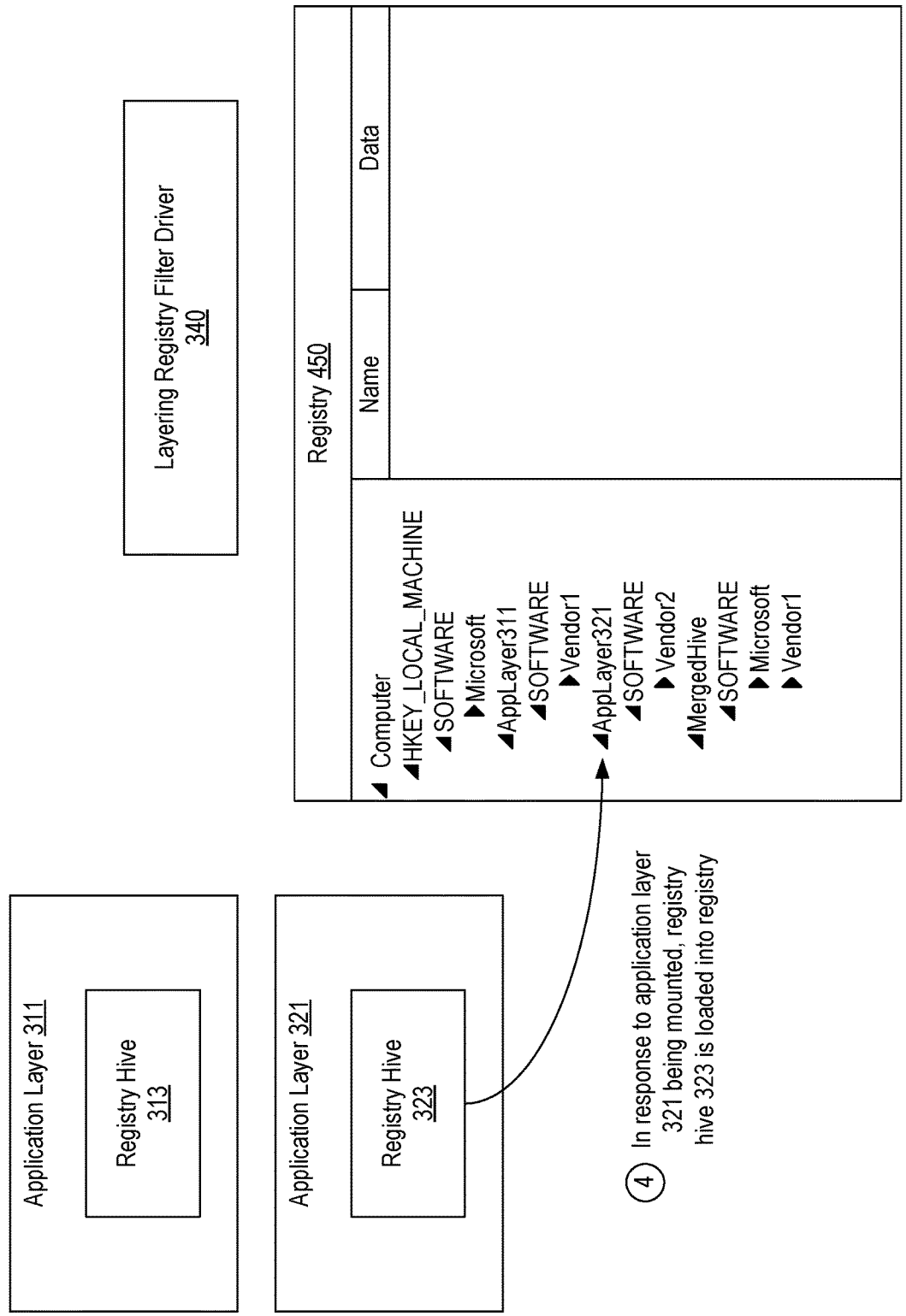

It is then assumed that application layer 321 is mounted in step 4 of FIG. 4D resulting in registry hive 323 being loaded into registry 450 under the AppLayer321 subkey. In response, and as represented by step 5 in FIG. 4E, LRFD 340 will update the merged hive to include the contents of registry hive 323. Accordingly, after application layers 311 and 321 are loaded, registry 450 will include registry hive 303 as is typical, registry hives 313 and 323 in accordance with layering techniques, and the merged hive in accordance with the techniques of the present invention.

Figure 4E:
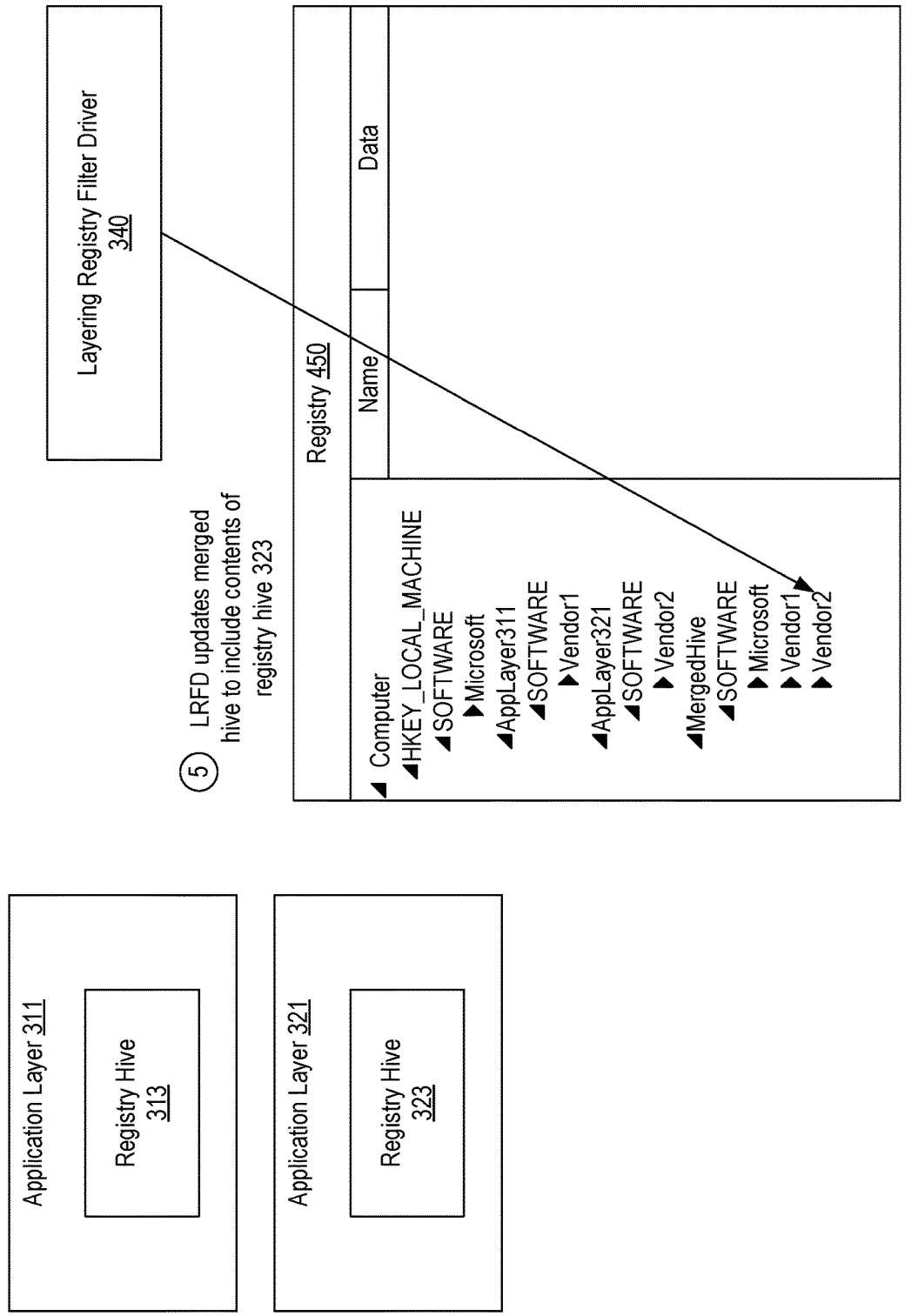

As can be seen in FIG. 4E, the merged hive will have a structure similar to what the structure of the HKLM key would be if the applications on application layer 311 and 321 had been installed on OS partition 301 rather than on application layers 311 and 321. In other words, the MergedHive key can represent the HKLM key in the hierarchical structure of the merged hive.

Figure 5:
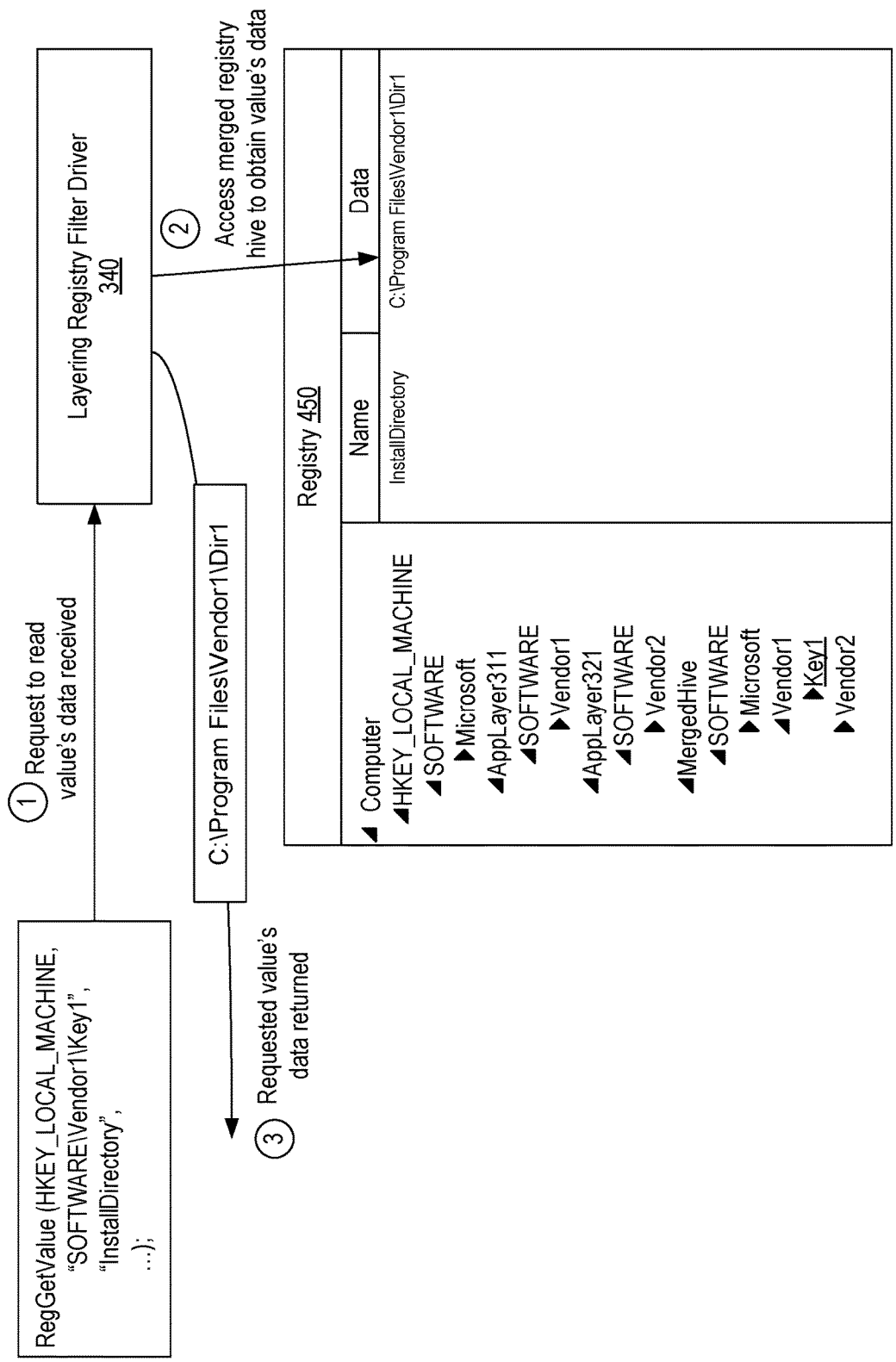
FIG. 5 illustrates an example of how a layering registry filter driver can process a non-modifying registry operation.

Because the merged hive includes all the contents of the other loaded registry hives, LRFD 340 can access the merged hive to process non-modifying registry operations thereby eliminating the need to iterate through each registry hive. FIG. 5 illustrates how LRFD 340 can perform this process.

In FIG. 5, LRFD 340 is shown as receiving a RegGetValue function in step 1. As is known, the RegGetValue function can be employed to obtain the type and/or data of a specified key's value. In this example, it will be assumed that the RegGetValue function requests the data of the InstallDirectory value of the HKLM\SOFTWARE\Vendor1\Key1 key. The RegGetValue function is an example of a non-modifying registry operation. Therefore, LRFD 340 can complete the call to the RegGetValue function by accessing the contents of the merged hive. In particular, as represented in step 2 of FIG. 5, LRFD 340 can perform the appropriate mappings to perform the RegGetValue within the merged hive rather than within hive specified in the function call. For example, LRFD 340 could modify the function call so that its second input parameter is "MergedHive\SOFTWARE\Vendor1\Key1." As a result, the data of the InstallDirectory value located under the key HKLM\MergedHive\SOFTWARE\Vendor1\Key1, which in this case is C:\Program Files\Vendor1\Dir1, will be obtained and returned to the calling application in step 3.

To illustrate how the merged hive increases the efficiency of the layering system, it is noted that, without the merged hive, LRFD 340 would have iterated through some ordering of the AppLayer311 and AppLayer321 hives until it found the target key. For example, LRFD 340 may have first modified the RegGetValue function to target HKLM\AppLayer321\SOFTWARE\Vendor1\Key1 which would have failed. Then, LRFD 340 would have attempted the RegGetValue function on HKLM\AppLayer311\SOFTWARE\Vendor1\Key1 which would have succeeded. Although this example only represents a case where one unnecessary registry access occurs, it can be seen that the inefficiency could greatly increase as the number of layers increases, especially given that most registry operations target the OS registry hive(s) rather than an application layer registry hive.

Although not shown in the Figures, a non-modifying registry operation targeting a key in OS hive 303 would be processed in the same manner. For example, if the second and third parameters of the RegGetValue function were to instead specify "SOFTWARE\Microsoft\Windows\CurrentVersion" and "CommonFilesDir," LRFD 340 could equally access the merged hive to obtain the data "C:\Program Files\Common Files" stored therein rather than accessing any of registry hives 303, 313, or 323. Therefore, the use of the merged hive can greatly increase the efficiency of processing non-modifying registry operations targeting the OS registry hive(s).

Figure 6A:
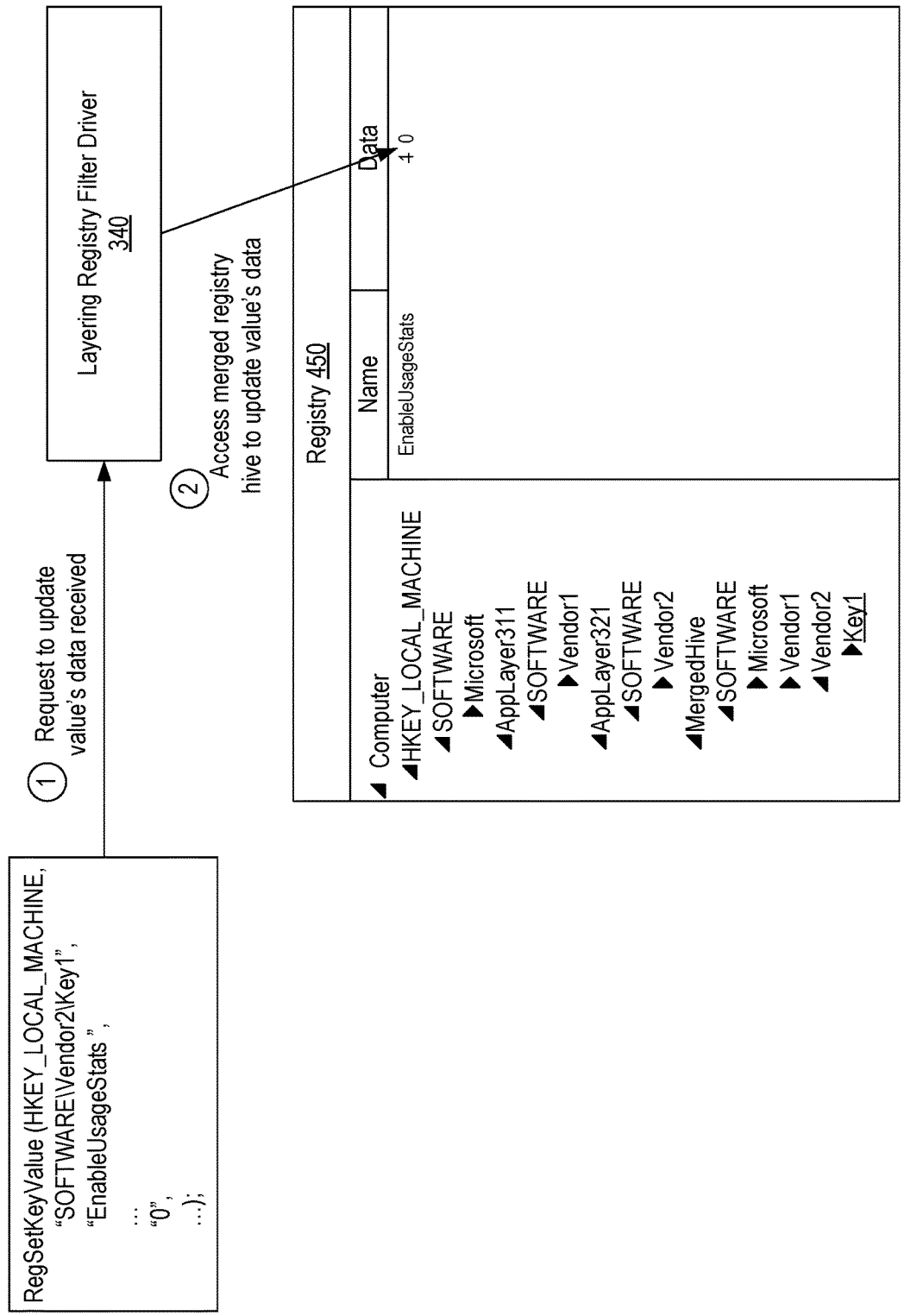
FIGS. 6A and 6B illustrate an example of how a layering registry filter driver can process a modifying registry operation.
Figure 6B:
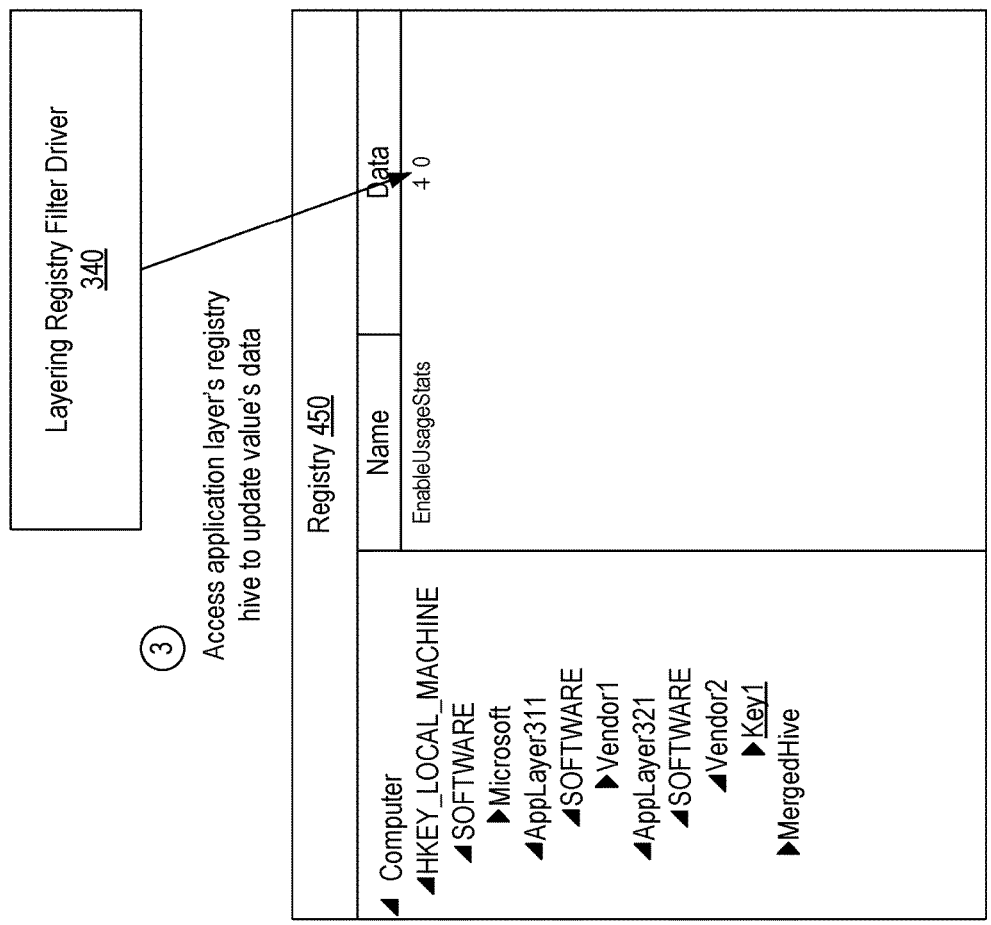

When it receives a modifying registry operation, LRFD 340 can perform substantially the same processing as when a non-modifying registry operation is received to update the key/value in the merged hive. However, in such cases, LRFD 340 can additionally update the key/value in the source registry hive (i.e., the OS or application layer registry hive where the key/value is stored). FIGS. 6A and 6B depict how this can be done.

In FIG. 6A, LRFD 340 is shown as receiving a RegSetKeyValue function in step 1. This RegSetKeyValue function targets the EnableUsageStats value of the HKLM\SOFTWARE\Vendor2\Key1 key and requests that its data be changed to 0. In the same manner as described above, LRFD 340 can map the RegSetKeyValue function so that it is directed to the merged hive. In particular, the second input parameter of the function can be changed to "MergedHive\SOFTWARE\Vendor2\Key1." As a result, the data of the EnableUsageStats value stored in the merged hive will be changed from 1 to 0 as represented in step 2.

Additionally, LRFD 340 can update the same value that is stored in the AppLayer321 hive as is represented by step 3 in FIG. 6B. LRFD 340 can perform this second update to ensure that the OS and application layer registry hives remain consistent with the merged hive. In some embodiments, in order to locate the appropriate registry hive, LRFD 340 could iterate through the hives until the hive containing the key/value is found. Therefore, this process of updating the OS or application layer registry hive in addition to the merged hive will likely increase the amount of processing when a modifying registry operation is performed. However, given that the number of non-modifying registry operations typically greatly exceeds the number of modifying registry operations, there will still be a substantial overall improvement to the efficiency of the layering system.

Alternatively, in some embodiments, when adding a key to the merged hive, LRFD 340 could also create a value in each registry key that identifies which OS or layer registry hive the key belongs to. For example, LRFD 340 could create a value "LayerDetails" for the key "MergedHive\SOFTWARE\Vendor2\Key1" with data of "AppLayer321." Then, when LRFD 340 performs a modifying registry operation on this key in the merged hive, it could employ the LayerDetails value to directly identify that the same key should be modified in the AppLayer321 registry hive. In this way, LRFD 340 will not need to iterate through the other registry hives when performing a modifying registry operation.

Figure 7A:
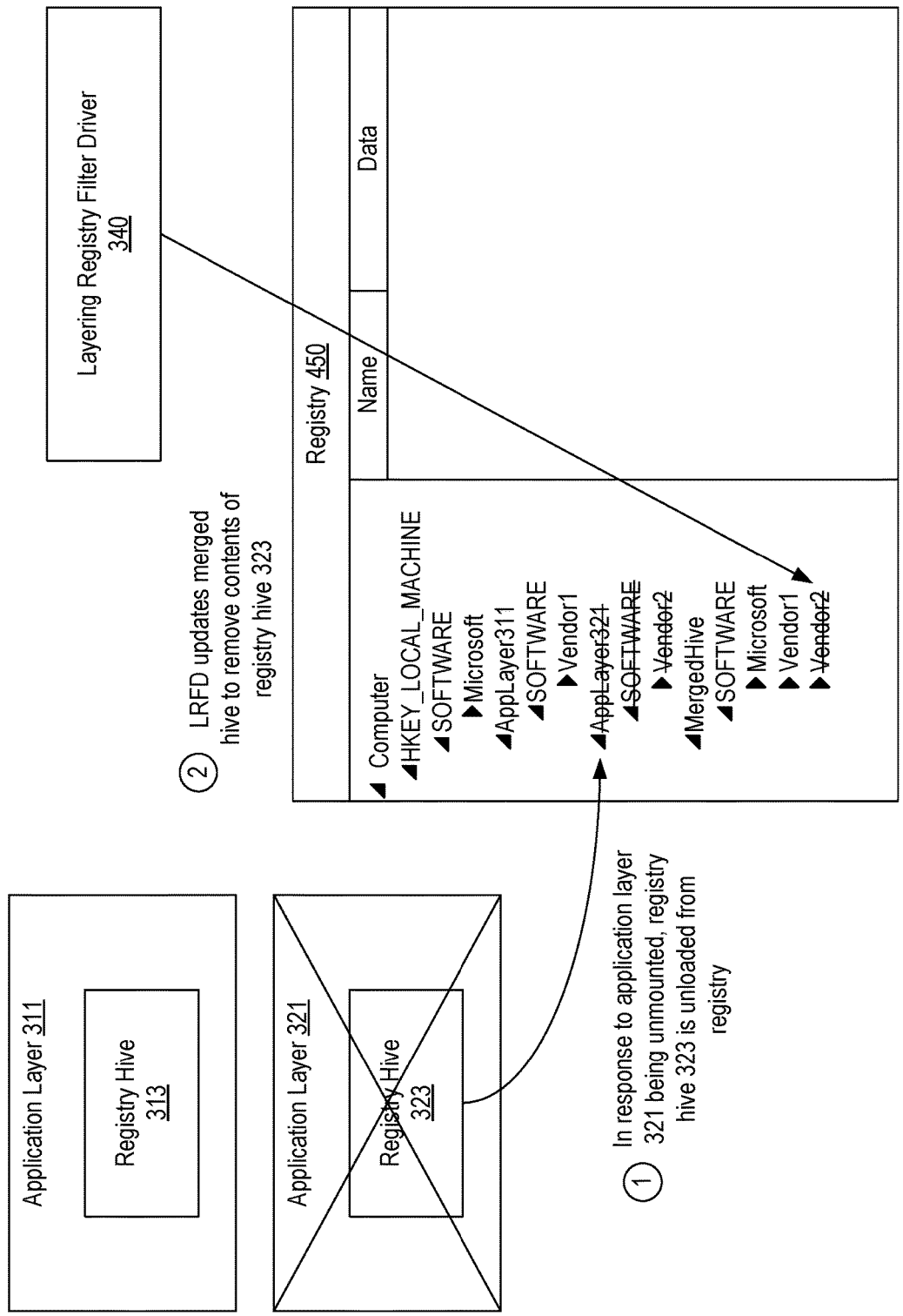
FIGS. 7A and 7B illustrate how a merged registry hive can be updated and removed when layers are unmounted.

In some embodiments, when an application layer is unmounted, LRFD 340 can update the merged hive to remove the content corresponding to the unmounted application layer. This process is represented in FIG. 7A. In FIG. 7A, it is assumed that application layer 321 has been (or is being) unmounted. As part of this unmounting, registry hive 323 can be unloaded from registry 450 as is represented by step 1. In this example, the AppLayer321 subkey, under which the contents of registry hive 323 are stored, and all of its subkeys can be removed from registry 450. In many cases, this removal or unloading of registry hive 323 will also involve writing the current state of the registry hive to application layer 321. Additionally, as represented by step 2, LRFD 340 can remove the corresponding content from the merged hive. In this example, LRFD 340 can delete the Vendor2 subkey and any of its subkeys from the merged hive. Because any updates to the merged hive will have also been made to corresponding OS or application layer registry hive, there will be no need to synchronize the merged hive prior to this deletion of the Vendor2 node.

Figure 7B:
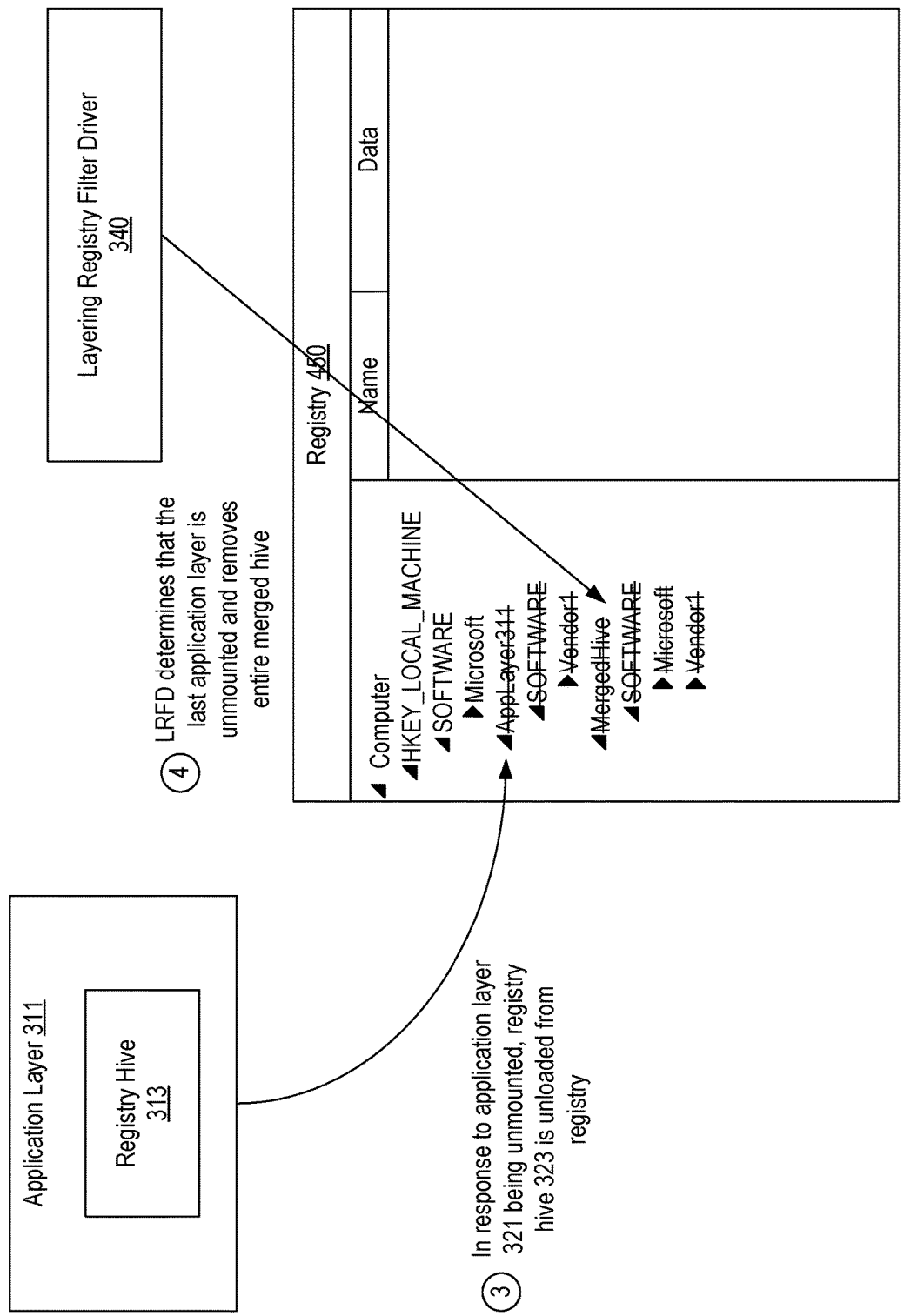

FIG. 7B illustrates that a similar process can be performed when application layer 311 is unmounted. In particular, in step 3, registry hive 313 is unloaded in response to application layer 311 being unmounted. However, because application layer 311 is the last mounted layer (i.e., no layers will be mounted after application layer 311 is unmounted), rather than updating the merged hive to remove the contents of registry hive 313, LRFD 340 can remove the entire merged hive in step 4. In other words, once no layers are mounted, registry 450 can be returned to its normal condition with all registry operations being handled in a normal fashion by the operating system.

In contrast to what is depicted in FIGS. 7A and 7B, in some embodiments, LRFD 340 will not remove content corresponding to an unmounted application layer from the merged hive when a layer is unmounted. Instead, LRFD 340 may wait until all layers have been unmounted and may then remove the entire merged hive. For example, with reference to FIG. 7A, LRFD 340 may not remove the Vendor2 node from the merged hive when application layer 321 is unmounted. Instead, the Vendor2 node would remain in the merged hive until all layers have been unmounted (i.e., until application layer 311 is also unmounted). In many embodiments, waiting until all layers have been unmounted to remove the merged hive may be preferred since there is little to no harm in maintaining obsolete keys in the registry.

Figure 8:
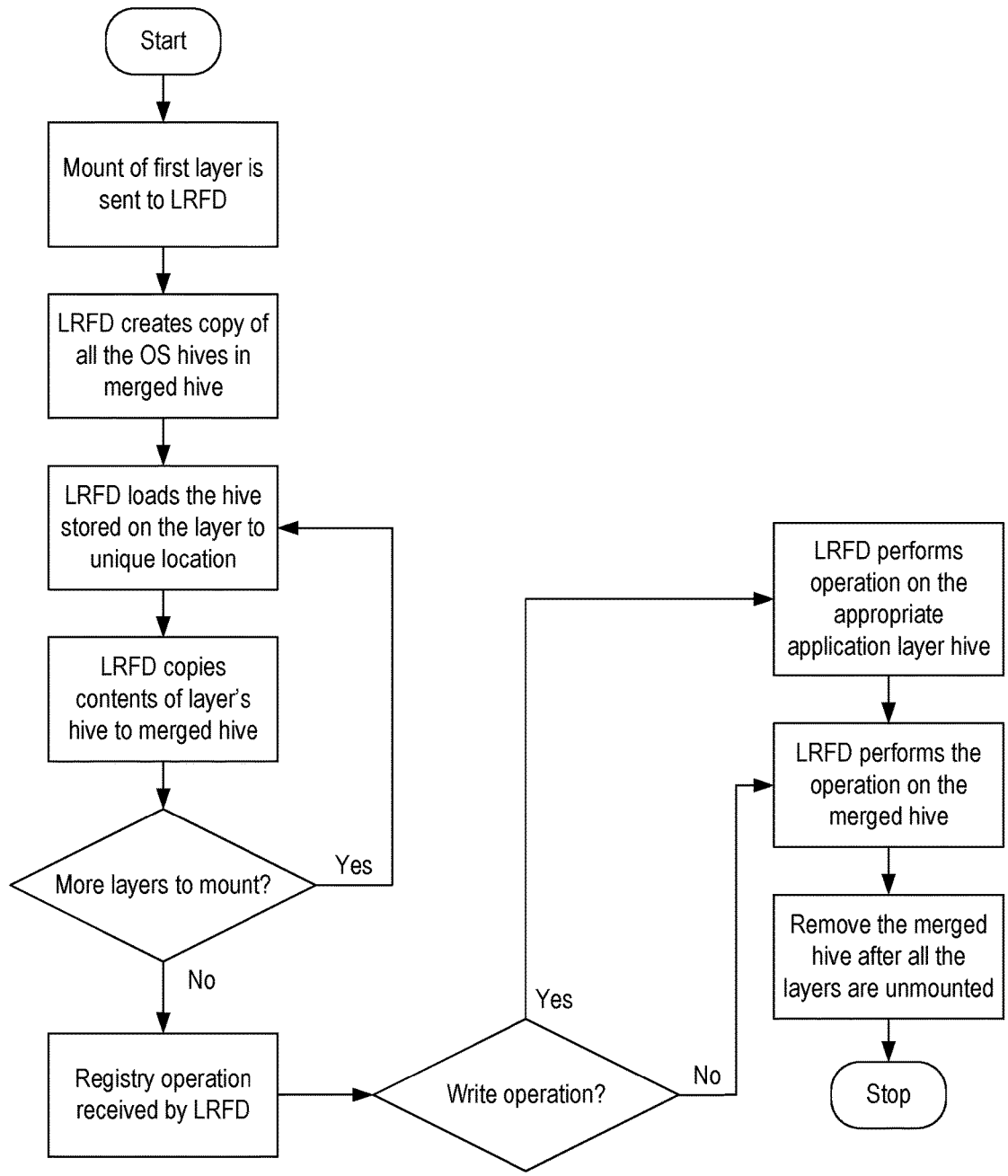
FIG. 8 provides a flowchart depicting the process that a layering registry filter driver can perform to create and employ a merged hive.

FIG. 8 provides a flowchart representing the process LRFD 340 can perform to create and employ a merged hive. At the start of this process, it is assumed that no layers have been mounted on the layering system. In a first step, the mount of a first layer is reported to LRFD 340. In response, LRFD 340 will create a copy of all the OS hives in a merged hive (e.g., under HKLM\MergedHive). Then, LRFD 340 will load the hive stored on the application layer to a unique location in the registry (e.g., to HKLM\Layer1). Additionally, LRFD 340 will copy the contents of the application layer's hive to the merged hive.

When any additional layer is mounted, its hive can also be loaded to a unique location and copied into the merged hive. With the merged hive created, registry operations can be intercepted by LRFD 340. For any received registry operation, LRFD 340 can determine whether the operation is a write operation or a read operation. If it is a write operation, LRFD 340 can perform the write operation on the appropriate application layer hive as well as on the merged hive. In contrast, if it is a read operation, LRFD 340 can perform the read operation only on the merged hive. Finally, when all layers are unmounted, LRFD 340 can remove the merged hive.

Figure 9:
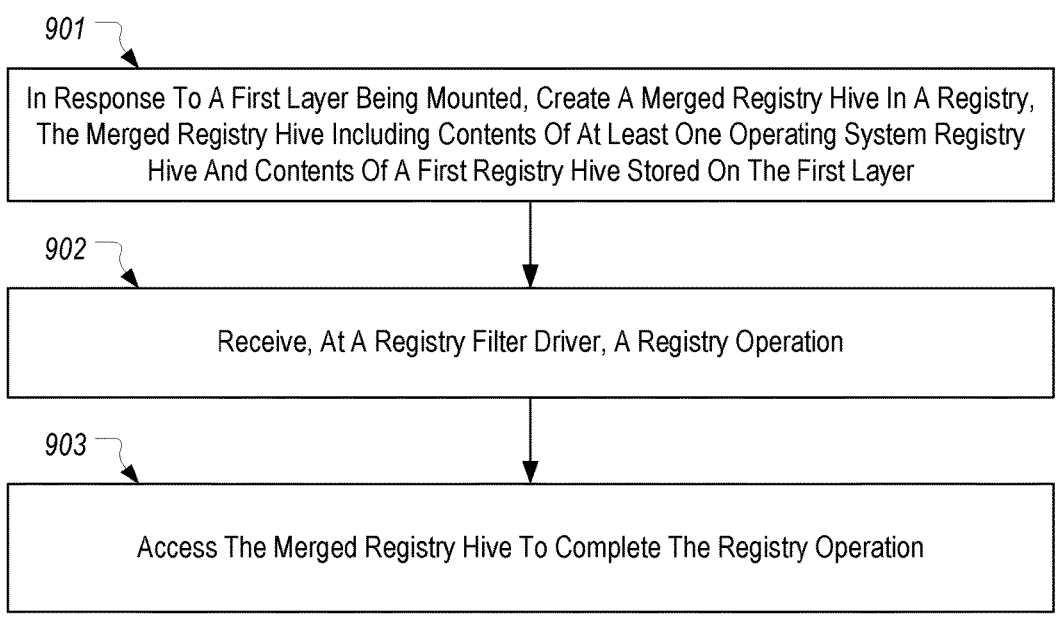
FIG. 9 illustrates a flowchart of an example method for merging application configurations to enhance multi-layer performance.

FIG. 9 illustrates a flowchart of an example method 900 for enhancing multi-layer performance by merging application configurations. Method 900 can be performed by a registry filter driver such as LRFD 340.

Method 900 includes an act 901 of, in response to a first layer being mounted, creating a merged registry hive in a registry, the merged registry hive including contents of at least one operating system registry hive and contents of a first registry hive stored on the first layer. For example, LRFD 340 can create a merged hive when application layer 311 containing registry hive 313 is mounted.

Method 900 includes an act 902 of receiving, at a registry filter driver, a registry operation. For example, LRFD 340 can intercept a RegGetValue function or a RegSetKeyValue function.

Method 900 includes an act 903 of accessing the merged registry hive to complete the registry operation. For example, LRFD 340 can access a value of the HKLM\MergedHive\SOFTWARE\Vendor1\Key1 key as opposed to accessing the HKLM\SOFTWARE, HKLM\AppLayer311, or HKLM\AppLayer321 nodes. Similarly, LRFD 340 can update a value of the HKLM\MergedHive\SOFTWARE\Vendor2\Key1 key.

In summary, the present invention can create a merged registry hive that includes the contents of any operating system hive as well as the content of any registry hive stored on a mounted layer. The merged registry hive can therefore serve as a single location that can be accessed to complete registry operations thereby enhancing the efficiency of a layering system.

Embodiments of the present invention may comprise or utilize special purpose or general-purpose computers including computer hardware, such as, for example, one or more processors and system memory. Embodiments within the scope of the present invention also include physical and other computer-readable media for carrying or storing computer-executable instructions and/or data structures. Such computer-readable media can be any available media that can be accessed by a general purpose or special purpose computer system.

Computer-readable media is categorized into two disjoint categories: computer storage media and transmission media. Computer storage media (devices) include RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other similarly storage medium which can be used to store desired program code means in the form of computer-executable instructions or data structures and which can be accessed by a general purpose or special purpose computer. Transmission media include signals and carrier waves.

Computer-executable instructions comprise, for example, instructions and data which, when executed by a processor, cause a general purpose computer, special purpose computer, or special purpose processing device to perform a certain function or group of functions. The computer executable instructions may be, for example, binaries, intermediate format instructions such as assembly language or P-Code, or even source code.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like.

The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices. An example of a distributed system environment is a cloud of networked servers or server resources. Accordingly, the present invention can be hosted in a cloud environment.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description.

What is claimed:

1. A method for enhancing multi-layer performance by merging application configurations, the method comprising:
while at least one operating system registry hive is loaded into a registry of an operating system and in response to a first layer being mounted as a volume by a file system to enable the operating system to access contents of the first layer, loading a first registry hive stored on the first layer into the registry;
creating a merged registry hive in the registry, the merged registry hive including contents of the at least one operating system registry hive and contents of the first registry hive such that the at least one operating system registry hive, the first registry hive and the merged registry hive exist in the registry;
receiving, at a registry filter driver, a registry operation; and
accessing the merged registry hive to complete the registry operation.

2. The method of claim 1, wherein the registry operation is a non-modifying registry operation.

3. The method of claim 1, wherein the registry operation is a modifying registry operation.

4. The method of claim 3, further comprising:
accessing the first registry hive or the at least one operating system registry hive in the registry to complete the registry operation.

5. The method of claim 4, wherein completing the registry operation comprises updating a key or value in the merged registry hive and updating a corresponding key or value in the first registry hive or in the at least one operating system registry hive.

6. The method of claim 1, further comprising:
in response to a second layer being mounted as a volume by the file system, updating the merged registry hive to include contents of a second registry hive stored on the second layer.

7. The method of claim 6, further comprising:
in addition to updating the merged registry hive to include the contents of the second registry hive, loading the second registry hive into the registry such that the at least one operating system registry hive, the first registry hive, the second registry hive and the merged registry hive exist in the registry.

8. The method of claim 1, further comprising:
in response to determining that all layers have been unmounted, removing the merged registry hive from the registry.

9. The method of claim 1, further comprising:
in response to determining that the first layer has been unmounted, removing the contents of the first registry hive from the merged registry hive.

10. The method of claim 1, wherein the first layer is an application layer that includes one or more applications, the first registry hive including configuration settings of the one or more applications.

11. The method of claim 1, wherein the contents of the first registry hive include a first key such that the first key is created in the merged registry hive, the method further comprising:
adding a value to the first key in the merged registry hive that defines that the first key is stored in the first registry hive.

12. One or more computer storage media storing computer executable instructions which when executed implement a method for enhancing multi-layer performance by merging application configurations, the method comprising:
mounting, by a file system, a first layer as a volume while one or more operating system registry hives are loaded into a registry of an operating system executing on the computing system, the first layer including a first registry hive;
as part of mounting the first layer:
loading the first registry hive into the registry; and creating a merged registry hive in the registry, the merged registry hive including contents of the first registry hive and contents of the one or more operating system registry hives;

mounting one or more additional layers as volumes, at least one of the one or more additional layers including a registry hive; and for each of the at least one of the one or more additional layers:

loading the registry hive of the additional layer into the registry; and updating the merged registry hive to include contents of the registry hive of the additional layer.

13. The computer storage media of claim 12, wherein the method further comprises:

receiving, at a registry filter driver, a non-modifying registry operation; and accessing the merged registry hive to complete the non-modifying registry operation.

14. The computer storage media of claim 13, wherein the method further comprises:

receiving, at the registry filter driver, a modifying registry operation; and accessing the merged registry hive and one of an operating system registry hive, the first registry hive, or a registry hive of an additional layer to complete the modifying registry operation.

15. The computer storage media of claim 12, wherein the method further comprises:

in response to determining that all layers are unmounted from the computing system, removing the merged registry hive from the registry.

16. The computer storage media of claim 12, wherein each of the at least one of the one or more additional layers is an application layer that stores one or more applications.

17. The computer storage media of claim 14, wherein completing the modifying registry operation comprises updating, creating, or deleting one of a key or value.

18. A layering system comprising:

one or more processors; and memory storing computer executable instructions which when executed implement:

a registry filter driver that is configured to create or update a merged registry hive in a registry of an operating system into which one or more operating system registry hives are loaded when a layer is mounted to the layering system, the merged registry hive including contents of the one or more operating system registry hives and contents of a registry hive stored on any layer that is mounted, wherein the layer is mounted as a volume by a file system, the registry filter driver being further configured to load the registry hive stored on any layer that is mounted into the registry such that the registry includes the one or more operating system registry hives, the merged registry hive and the registry hive stored on any layer that is mounted.

19. The layering system of claim 18, wherein the registry filter driver is further configured to access the merged registry hive to complete a registry operation.

20. The layering system of claim 19, wherein the registry filter driver is further configured to remove the merged registry hive when all layers have been unmounted from the layering system.

* * * * *